(12) United States Patent
Nevis

(10) Patent No.: US 6,222,679 B1
(45) Date of Patent: Apr. 24, 2001

(54) MECHANICALLY SIMPLIFIED, HIGH RESOLUTION, OPTICAL FOCUSING AND STEERING APPARATUS

(75) Inventor: Elizabeth Anne Nevis, Sunnyvale, CA (US)

(73) Assignee: Agilent Technologies, Palo Alto, CA (US)

( * ) Notice: Subject to any disclaimer, the term of this patent is extended or adjusted under 35 U.S.C. 154(b) by 0 days.

(21) Appl. No.: 09/387,581

(22) Filed: Aug. 31, 1999

(51) Int. Cl.[7] ............................ G02B 27/30; G02B 27/10
(52) U.S. Cl. ............................ 359/641; 359/626
(58) Field of Search ................... 359/618, 622, 359/642, 663, 669, 626, 641, 557; 385/31, 33, 35, 93

(56) References Cited

U.S. PATENT DOCUMENTS

| | | | |
|---|---|---|---|
| 3,761,157 | * 9/1973 | Humphrey | 359/557 |
| 5,077,622 | 12/1991 | Lynch et al. | 359/813 |
| 5,182,671 | * 1/1993 | Kitagishi et al. | 359/557 |
| 5,796,531 | * 8/1998 | Keneda et al. | 359/832 |

* cited by examiner

Primary Examiner—Georgia Epps
Assistant Examiner—Saeed Seyrafi
(74) Attorney, Agent, or Firm—Jack H. Wu

(57) ABSTRACT

A method and apparatus for focusing a free beam of light onto a target. The target is often very small or angle restricted. The apparatus includes a lens surrounded by two parallel windows. The focusing of the free beam is achieved by tilting the first window to orient the beam of light through the lens onto the target, adjusting the lens focus to focus the beam of light into a focused spot, and tilting the second window to translate the focused spot across the target. The lens may also be tilted to provide a greater range of translation.

16 Claims, 4 Drawing Sheets

MECHANICALLY SIMPLIFIED, HIGH RESOLUTION, OPTICAL FOCUSING AND STEERING APPARATUS

FIELD OF INVENTION

The current invention relates to the focusing and aiming of free-space beams onto a target.

BACKGROUND OF THE INVENTION

The focusing and aiming of free-space beams onto a target is critical in such applications as fiber optics. It is often necessary to provide a long-range of travel for the focused beam while maintaining a small, undistorted spot and maintaining the average incidence angle within the angular tolerance of the target. Attempted solutions have failed to achieve all these objectives or do so in a manner that is inefficient or unwieldy.

For example, single lens launchers do not provide enough degrees of freedom to compensate for common fabrication errors. For instance, if the incoming beam is not centered on the target to begin with, all the light may not enter the target no matter how well the lens is adjusted in a single lens launcher. Two-lens launchers provide more degrees of freedom, but the angle cannot be adjusted independent of the position. The apparatus disclosed in U.S. Pat. No. 5,077,622, titled "Apparatus For Precision Focussing and Positioning of A Beam Waist On A Target" and issued Dec. 31, 1991 to Lynch et al, achieves high-resolution positioning, but requires at least seven separate adjustment axes and is difficult to fit in a compact package. Finally, tapered fibers reduce the resolution required by making the target bigger at the input and tapering down to the final size. In addition to being expensive, these are also less efficient since light is lost in the taper. Indeed, the larger the taper the more light is lost. Tapered fibers are also not useful for polarization-maintaining applications, since the taper scrambles the polarization of the light.

SUMMARY OF THE INVENTION

The current invention is a method and apparatus for precisely focusing and aiming onto a very small and/or angle restricted target. The apparatus comprises a lens surrounded by two parallel windows. These components may be available off the shelf. Even if they must be custom-made for a particular application, the windows are straightforward to fabricate. The first window is an orientation window that orients the beam through the lens and toward the target. The second window is a translation window that translates the focused spot across the target, correcting for any mis-alignment of the lens.

The adjustments of the apparatus are tilting of the two windows and longitudinal translation (focusing) of either the lens or the target. High efficiency and a small spot size can be achieved even if the alignment of the non-adjustable components is imperfect. The focused beam can be translated and tilted independently for the best alignment to the target. The apparatus provides a long range of travel while maintaining a small, undistorted spot. The apparatus can be made compact and rugged, for use in applications with limited space. Likewise, standard manipulators, such as flexure plates and screws, can be used to tilt the windows and focus the lens from the front of the apparatus. As compared to prior attempted solutions, the current invention requires a minimal number of adjustments to achieve precise alignment.

In another embodiment, the lens is also capable of tilting. Tilting the lens in addition to the translation window increases the distance the focused spot can be translated before coma significantly distorts the spot. This allows for a greater ability to correct the mis-alignment of the lens and the target.

DETAILED DESCRIPTION OF THE INVENTION

Figure 1:
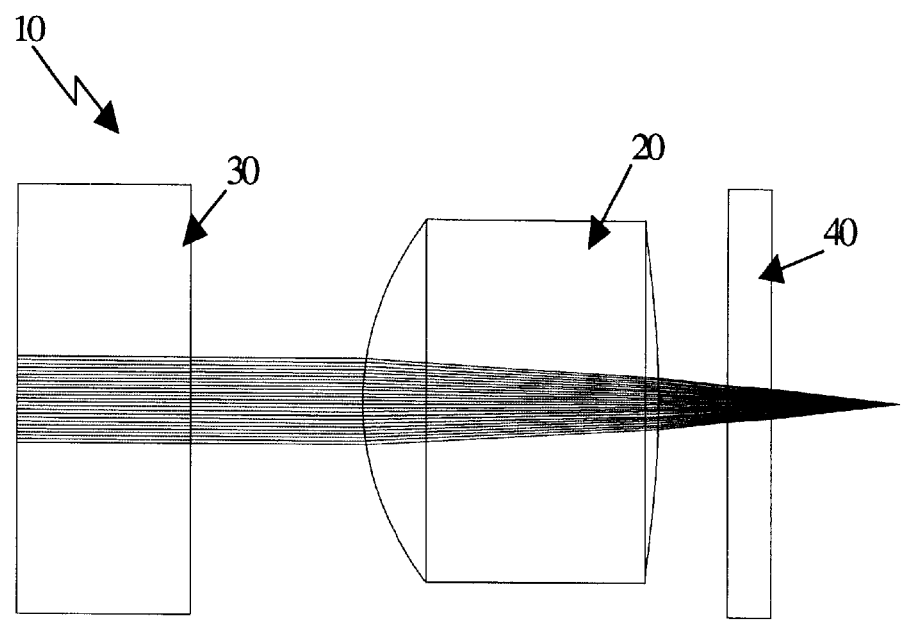
FIG. 1 is a diagram of the optical focusing and steering apparatus

The optical focusing and steering apparatus 10 allows for the precise alignment of a free-space beam of light to a small and/or angle-restricted target such as a single-mode fiber. The apparatus 10 comprises a lens 20 between two flat windows, as seen in FIG. 1. Readily available optics may be used for the lens 20 and windows, minimizing costs and simplifying replacement of parts. Simple and rugged mechanisms including standard actuators and fasteners are used, likewise minimizing costs and simplifying replacement. The final package can be made compact allowing assembly and alignment in a confined space with access to only one side. Typically, the final package is a housing that contains the lens 20, the two windows 30, 40, tilting mechanisms, and a focusing mechanism. Preferably, the package provides access to these mechanisms in its front.

Figure 2:
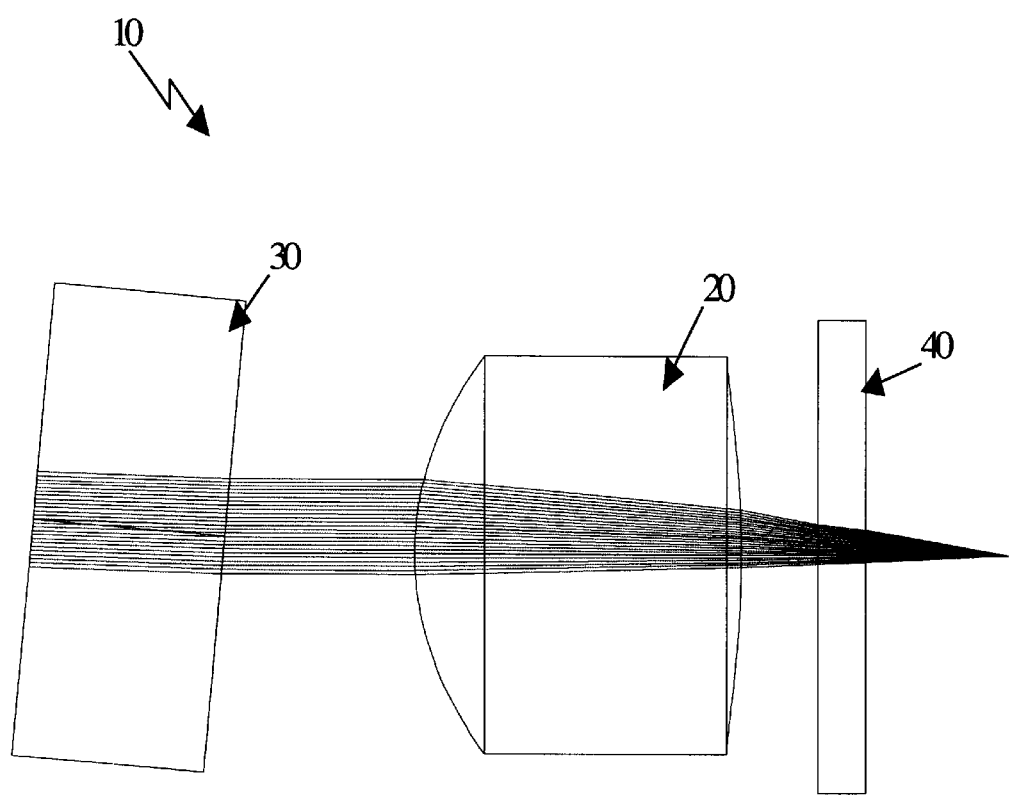
FIG. 2 is a diagram of the optical focusing and steering apparatus illustrating the tilting of an orientation window.

The first window is the orientation window 30, as shown in FIG. 1. The orientation window 30 generally orients the beam through the lens and toward the target (not shown). The orientation window 30 accomplishes this by tilting in the beam, as seen in FIG. 2 and discussed below. The orientation window 30 is typically a low-aberration window designed according to the desired package size, the required angular aiming resolution and the centration tolerance stack-up. An angle-sensitive target will have acceptance angle range within which the converging beam average incidence angle must fall for best results. The acceptance angle range of the target determines the required angular aiming resolution of the orientation window 30. The centration tolerance is the target's tolerance for centering of the converging beam.

The angular range and resolution achievable by the orientation window 30 is not only dependent on the thickness and refractive index of the orientation window 30. The focal length of the lens 20 and the range and resolution of the tilting mechanism must also be taken into consideration. The orientation window 30 translates the beam across the lens 20 and the lens 20 transforms that translation into a change in angle. First-order calculations determine the input beam translation "y" for a tilt angle "α" of an orientation window 30 having thickness "t" and refractive index "n" at the wavelength of interest:

$$y = \frac{t}{\cos(\alpha)} * \frac{\sin\left[\alpha - \sin^{-1}\left(\frac{\sin(\alpha)}{n}\right)\right]}{\left\{\sin(\alpha) * \sin\left[\alpha - \sin^{-1}\left(\frac{\sin(\alpha)}{n}\right)\right] + 1\right\}} \quad (1)$$

An equivalent thin lens of focal length "f", for small translations, will change the input translation "y" into an output angle "u":

$$u \sim \frac{y}{f}$$

These calculations provide a starting point for choosing components, but a thorough treatment by an accurate raytrace code is recommended before ordering the components. The orientation window 30 range will also be limited by the size of the lens 20 compared to the input beam, the aberration response of the lens 20 to decentration (it is advisable to choose the lens 20 that is forgiving of this type of displacement), and the amount of orientation window 30 tilt that can be allowed in the available space. The orientation window 30 resolution is largely determined by the angular resolution of its tilting mechanism.

If an angle-sensitive target (not shown) is mounted at an angle, or if the input beam, lens 20 and target are not coaxial within the target's tolerances, tilting the orientation window 30 compensates for the error and couples the most light onto the target. As illustrated by FIG. 2, tilting the orientation window 30 in the input beam can (1) center the beam on a slightly misplaced lens 20 to minimize optical aberration and/or (2) change the average incident angle at the target without moving the converging beam spot. This second effect of tilting the orientation window 30 is due to the fact that the converging beam pivots around its focus. Preferably, adjustment of the tilt of the orientation window 30 is accomplished from the front of the apparatus 10 with a tilting mechanism (not shown) including standard actuators, such as flexure plates and screws or piezos (piezodielectric positioners) that are connected to the orientation window 30.

The lens 20 focuses the beam onto the target. The lens 20 is a high-quality lens 20 whose aberrations do not increase drastically if a window is placed in the converging beam. Many off the shelf lenses providing low aberration at short focal lengths are designed for use as microscope objectives, and were originally optimized with a window (i.e., the cover slip on a microscope slide) between the lens and the image plane. In the embodiment shown in FIG. 1, the lens 20 is an aspheric lens made from molded plastic or glass. The lens 20 can also be multi-spheric or anamorphic (for example, a lens that has a cylindrical or toroidal surface, and made from molded plastic or glass or blown glass). The size of the lens 20 depends on the application and the package size.

If the lens' 20 optic axis and the target's optic are reasonably collinear (for example, a 5 mm focal length lens is centered within 0.025 mm), it only needs a focus adjustment to compensate for errors in the focal length or the placement of the target. If the target is fixably mounted tolerably within range of the beam waist, then a focus adjustment may not be needed even if the lens' 20 focal length varies within the manufacturer's specifications and/or efficiency is less critical. To focus the beam, the lens 20 may move, the entire apparatus 10 may move, and/or the target may move. The target may move if it will not be detached and replaced many times with highly repeatable beam couplings or if the lens' 20 focusing mechanism is so rugged that the stresses of removing and replacing the target will not cause a loss of alignment. Preferably, the focusing mechanism is actuated from the front of the apparatus 10 rather than requiring side access. The focusing mechanism includes standard actuators connected to the lens 20, such as flexure plates and screws or piezos.

The translation window 40 is placed in the converging beam between the lens 20 and the target (not shown), as seen in FIG. 1. The translation window 40 generally helps to avoid or correct any mismatch between the focused spot of the converging beam and the target, which has a finite size. Preferably, if the lens 20 was designed to image through a window, the translation window 40 will cause the same optical path differences as the design window the lens 20 was designed to image through. If the lens 20 was designed to image through a window (such as a microscope cover slip or the window in the housing of a diode laser) and is used at the design wavelength, then the translation window 40 will cause minimal aberrations if its characteristics are similar to the design window. However, if the design wavelength is different than the wavelength actually used then the translation window 40 should be chosen for the wavelength used.

Figure 3:
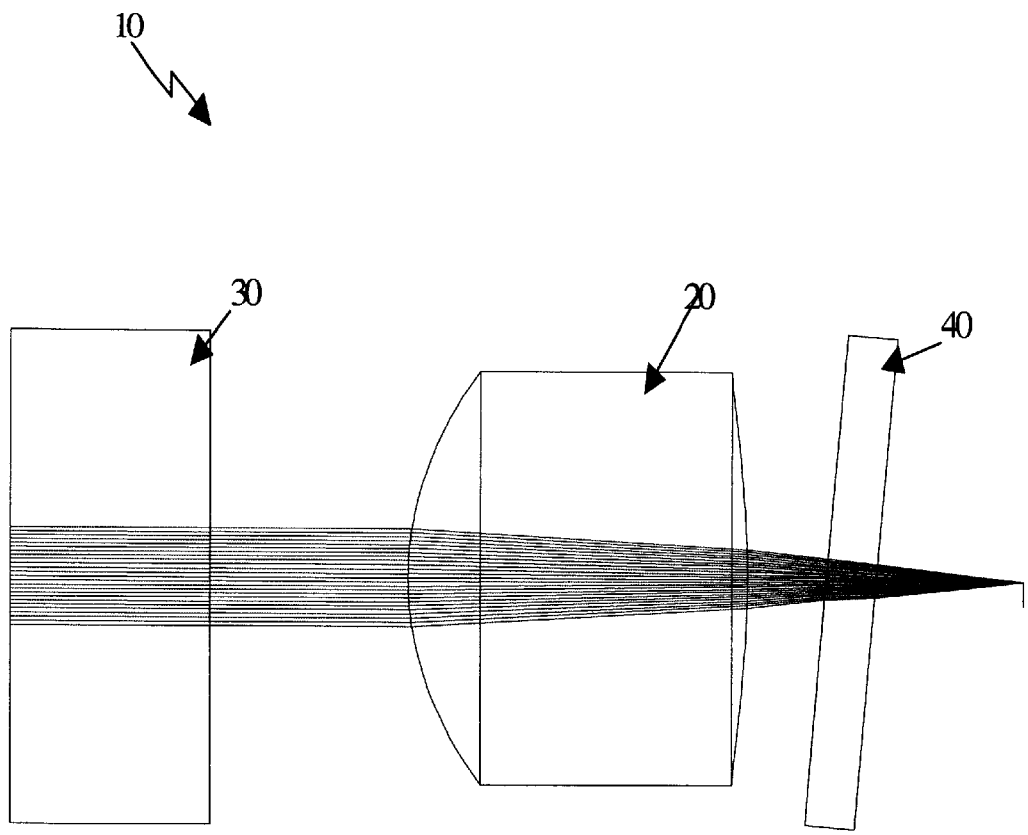
FIG. 3 is a diagram of the optical focusing and steering apparatus illustrating the tilting of a translation window

Tilting the translation window 40 in the converging beam, as seen in FIG. 3, causes the focused spot of the converging beam to translate across the target without disturbing the incidence angle. This allows the focused spot to be "moved" so that it is within the centration tolerance of the target and on the optic axis of the target. This centering of the focused spot allows for the correction of the mis-alignment of the lens 20 and the target.

However, too much tilt of the translation window 40 can cause the focused spot to spread out due to coma aberrations. More translation can occur for less tilt, and accordingly less aberration, if the translation window 40 is thicker or is made of a higher-index glass. The thickness of the translation window 40 is limited by the package size and polarization concerns. If polarization matters, such as in polarization-critical applications including coupling a free-space beam into a single-mode polarization-preserving fiber, the translation window 40 needs to be made of an isotropic material. Many popular high-index materials such as sapphire are birefringent and can degrade the polarization unless their crystalline axes are very precisely oriented. In addition, some nominally isotropic materials, such as BK7 glass, may become weakly birefringent if subjected to excessive mechanical stress while being molded, cut, ground, or mounted, or if the pieces are cut from low-grade bulk material that is not homogeneous. In highly polarization-critical applications, all translation window 40 glass should be Grade AA or better, and additional annealing is recommended if the translation window 40 is thicker than 2.5 mm. The translation window 40 shown in the Figures is a 2 mm window, designed for use in a polarization-critical application. The allowable thickness of the translation window 40 will also be limited when the lens 20 has a very short back focal distance.

Preferably, adjustment of the tilt of the translation window 40 is accomplished in a similar manner to that of the orientation window 30. Accordingly, adjusting the tilt of the translation window 40 is also accomplished from the front of the apparatus 10 using a tilting mechanism that includes standard actuators, such as flexure plates and screws or piezos, that are connected to the translation window 40.

Figure 4:
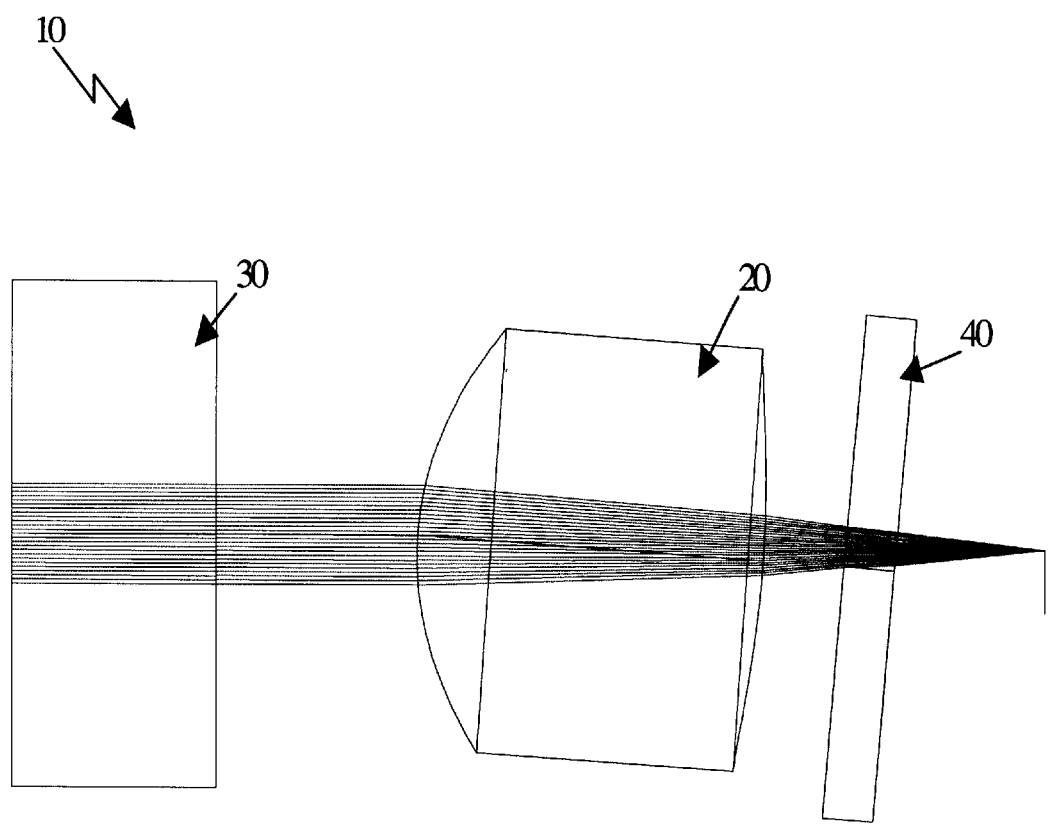
FIG. 4 is a diagram of the optical focusing and steering apparatus illustrating the tilting of a lens and the translation window.

In order to compensate and correct even looser mechanical mounting tolerances on the lens 20 and target, the lens 20 can also have a tilt adjustment, as seen in FIG. 4. Tilting the lens 20 along with the translation window 40 increases the range over which the focused spot can be translated without spreading out due to comatic aberration.

Focusing the lens 20 when tilting the translation window 40 overcomes much of the aberration, but also tilting the lens 20 produces the best results.

Preferably, adjustment of the tilt of the lens 20 is accomplished with a tilting mechanism including actuators, as with the orientation window 30 and translation window 40 described above. The tilting mechanism for the lens 20 may be coupled to the tilting mechanism for the translation window 40.

Preferably the target (not shown) is mounted rigidly, independent of the adjustable components described above, so that if it is removed and replaced there is no risk of mis-aligning the rest of the assembly. This is ideal for fibers and other targets that removed and replaced by an end user with little or no optical expertise. For some applications, it may be desirable to flexibly mount the target to provide a greater degree of adjustment. This is true particularly for targets that do not undergo many remove-replace cycles during their lifetime, but are short-lived compared to the rest of the assembly and may exhibit differences in optical response from (original) part to (replacement) part. For example, instead of moving the lens 20 or the apparatus 10 to adjust the focus of the beam, the target may be moved to adjust the focus.

The apparatus 10 may be modified for the particular application in which it is to be used. A variety of tradeoffs can be made between range and resolution through the choice of the windows and location of the tilting mechanism. For example, a thicker translation window 40 will provide greater translation for less tilt, but may be less homogeneous if the glass quality is not well-controlled, and will provide poorer resolution than a thinner window for the same tilting mechanism. The translation of the focused spot resulting from tilting the translation window 40 (alone) follows the same first-order equation (1) discussed above for the orientation window 30. For a given translation window 40, thickness "t" and refractive index "n" are constants and the only variable is the tilt angle $\alpha$. If both the translation window 40 and the lens 20 are tilted, ray-trace modeling with a reliable code is recommended.

The apparatus 10 shown in the Figures is designed for use in coupling a free-space beam into a single mode polarization-preserving fiber. The apparatus 10 may similarly be used in other applications with infinite conjugates and a collimated beam, such as diagnostics of beams and optical systems based on spatial analysis of the focused spot, focusing of beams through spatial filters, and injection of beams into integrated-optic systems or semiconductor-laser amplifiers. If the target is not angle-sensitive, no orientation window 30 is needed.

While the invention has been disclosed with reference to the details of preferred embodiments of the invention, it is to be understood that the disclosure is intended in an illustrative rather than in a limiting sense, as it is contemplated that modifications will readily occur to those skilled in the art, within the spirit of the invention and the scope of the appended claims.

What is claimed is:

1. An apparatus for aligning a free-space beam of light to the small target, comprising: an orientation window, located in the path of the beam of light, wherein the beam has an average incident angle at the target and the orientation window orients the beam of light toward the target by changing the average incident angle of the beam on the target; a lens, wherein the lens focuses the beam, after it passes through the orientation window, so that the beam converges to a spot on the target; and a translation window, located in the path of the converging beam, where the translation window translates the spot across the target, without disturbing the average incident angle, wherein the orientation window, the translation window and the lens independently tilts in the beam of the light a phrase.

2. The apparatus of claim 1, further comprising an actuator connected to the orientation window, wherein the actuator causes the orientation window to tilt when actuated.

3. The apparatus of claim 1, further comprising an actuator connected to the translation window, wherein the actuator causes the translation window to tilt when actuated.

4. The apparatus of claim 1, wherein the lens is an aspheric lens.

5. The apparatus of claim 1, further comprising an actuator connected to the lens, wherein the actuator adjusts the lens focus when actuated.

6. The apparatus of claim 1, wherein the lens tilts with the translation window in order to translate the spot across the target.

7. The apparatus of claim 6, further comprising an actuator connected to the lens, wherein the actuator causes the lens to tilt when actuated.

8. The apparatus of claim 1, further comprising actuators connected to the orientation window, the lens, and the translation window, wherein the actuators cause the orientation window, the lens, and the translation window to tilt when actuated.

9. The apparatus of claim 8, further comprising a housing with a front, wherein the orientation window, lens, translation window, and the actuators are located within the housing and the actuators are actuated from the front of the housing.

10. A method for aligning a free-space beam of light to the small target, comprising: placing an orientation window in the path of the beam of light; orienting the beam of light onto the target at a desired average incidence angle with the orientation window; placing a lens in the path of the beam of light after the orientation window; focusing the beam of light into a converging beam onto the target; placing a translation window into the path of the converging beam; and translating the converging beam across the target without disturbing the average incidence angle of the beam, wherein the orientation window, the translation window and the lens independently tilts in the beam of the light.

11. The method of claim 10, wherein the translating step comprises the step of tilting the lens.

12. An apparatus for aligning a free-space beam of light to a small target, comprising:

an orientation window, located in the path of the beam of light, wherein the beam has an average incident angle at the target and the orientation window tilts in order to orient the beam of light onto the target by changing the average incident angle of the beam on the target;

a lens, wherein the lens focuses the beam, after it passes through the orientation window, so that the beam converges to a spot on the target;

a translation window, located in the path of the converging beam, wherein the translation window tilts in order to translate the spot across the target, without disturbing the average incidence angle, so that the spot may be aimed on the target; and a plurality of actuators that independently tilt the orientation window, the translation window, the lens and adjust the focus of the lens when actuated.

13. The apparatus of claim 12, wherein the lens tilts with the translation window to translate the spot across the target and the plurality of actuators include an actuator that tilts the lens when actuated.

14. The apparatus of claim 12, further comprising a housing with a front, wherein the actuators may be actuated from the front of the housing.

15. The apparatus of claim 12, wherein the lens is an aspheric lens.

16. The apparatus of claim 12, wherein the lens is a non-aspheric lens.

* * * * *